US008397362B2

(12) United States Patent
Burg et al.

(10) Patent No.: US 8,397,362 B2
(45) Date of Patent: Mar. 19, 2013

(54) DEVICE FOR SETTING A FASTENER ELEMENT

(75) Inventors: Patrice Burg, Steinbrunn-le-Bas (FR); Martin Büsch, Efringen-Kirchen (DE)

(73) Assignee: A. Raymond et Cie, Grenoble (FR)

( * ) Notice: Subject to any disclaimer, the term of this patent is extended or adjusted under 35 U.S.C. 154(b) by 0 days.

(21) Appl. No.: 13/266,168

(22) PCT Filed: Jun. 15, 2010

(86) PCT No.: PCT/EP2010/058412
§ 371 (c)(1),
(2), (4) Date: Oct. 25, 2011

(87) PCT Pub. No.: WO2011/015404
PCT Pub. Date: Feb. 10, 2011

(65) Prior Publication Data

US 2012/0137483 A1 Jun. 7, 2012

(30) Foreign Application Priority Data

Aug. 6, 2009 (DE) ........................ 10 2009 036 334

(51) Int. Cl.
*B23P 11/00* (2006.01)
*B21D 31/00* (2006.01)

(52) U.S. Cl. ...... 29/243.53; 29/509; 29/566.1; 72/391.2

(58) Field of Classification Search ................. 72/391.2, 72/391.3, 393; 29/243.517, 243.519, 243.53, 29/238, 509, 566.1
See application file for complete search history.

(56) References Cited

U.S. PATENT DOCUMENTS

| | | | | | |
|---|---|---|---|---|---|
| 2,315,209 | A | * | 3/1943 | Kost | 29/566.1 |
| 2,365,787 | A | * | 12/1944 | Wallace | 29/238 |
| 2,605,011 | A | * | 7/1952 | Volpe | 29/243.53 |
| 3,442,112 | A | * | 5/1969 | Abromavage et al. | 29/509 |
| 4,089,099 | A | * | 5/1978 | Nivet | 29/243.519 |
| 4,493,205 | A | * | 1/1985 | Ramey | 72/391.2 |
| 4,872,332 | A | * | 10/1989 | Potzas | 72/393 |

FOREIGN PATENT DOCUMENTS

| | | | |
|---|---|---|---|
| DE | 4008829 | A1 | 9/1991 |
| FR | 2555089 | A1 | 5/1985 |
| GB | 191117969 | A | 0/1911 |
| SE | 123478 | C | 11/1948 |

OTHER PUBLICATIONS

The International Search Report and Written Opinion mailed Nov. 18, 2010 in the parent International application No. PCT/EP2010/058412.

* cited by examiner

*Primary Examiner* — David B Jones
(74) *Attorney, Agent, or Firm* — Faegre Baker Daniels

(57) ABSTRACT

The invention relates to a device for setting a fastener element (55) having an inner pin (56) slidable relative to an outer body (57) and comprising a locking arrangement (32, 33; 38, 39) comprising a bolt (19) provided for acting on the inner pin (56) and secured in a retracted position against axial displacement into an advanced position after relatively spacing a handle body (52) and an actuating organ (8, 46). When the actuating organ (8, 46) is actuated by a displacement opposite the retraction direction, an unlatching organ (40, 41) acts on the locking arrangement (32, 33; 38, 39) and releases the bolt (19) for displacing into the advanced position. Very simple handling of the manually actuated device is thus ensured.

10 Claims, 7 Drawing Sheets

DEVICE FOR SETTING A FASTENER ELEMENT

CROSS-REFERENCE TO RELATED APPLICATION

This application is a U.S. National Phase Patent Application based on International Application Serial No. PCT/EP2010/058412 filed Jun. 15, 2010, the disclosure of which is hereby explicitly incorporated by reference herein.

BACKGROUND OF THE INVENTION

1. Field of the Invention

The present invention is directed to a device for setting a fastener element.

2. Description of the Related Art

One known device for setting a fastener element having an inner pin slidable relative to an outer body is known from DE 40 08 829 A1. This prior device comprises a grip body extending in a longitudinal direction and a bolt accommodated in the grip body slidably in the axial direction and acting in an advanced position on an inner pin of a fastener element. Also present is a locking arrangement by which the bolt, in a retracted position, is secured against sliding axially into the advanced position. The locking arrangement includes an actuating element rotatable in a circumferential direction and serving, in a releasing position, to release the bolt so that it can be slid manually from the retracted position to the advanced position.

SUMMARY OF THE INVENTION

The present invention provides a device for setting a fastener element of the initially cited kind, by means of which the bolt can be moved back and forth between the advanced position and the retracted position in a relatively easy to perform manipulation.

By virtue of the fact that in the device according to the invention, an actuating mechanism is present by means of which the bolt can be moved from the advanced position to the retracted position and back again by movement in or counter to an axially oriented pull-up direction, the device can, in a very easy to perform manual operation, be placed in a ready-for-use arrangement, in which the bolt is in the retracted position, and in an actuated arrangement, in which the bolt has moved from the retracted position to the advanced position.

In one form thereof, the present invention provides a device for setting a fastener element having an inner pin slidable relative to an external body, which device comprises a grip body extending in a longitudinal direction; a bolt which is accommodated in the grip body slidably in an axial direction and which in an advanced position acts on an inner pin of a fastener element; and a locking arrangement, by means of which the bolt, in a retracted position, is secured against sliding axially into the advanced position, characterized in that an actuating mechanism connected to the grip body is present and is in engagement with the bolt and serves, on movement in an axially oriented pull-up direction, to move the bolt from the advanced position to the retracted position; and in that an unlocking mechanism is formed that interacts with the actuating mechanism and acts on the locking arrangement, and by means of which the securement of the bolt can be released by moving the actuating mechanism counter to the pull-up direction.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
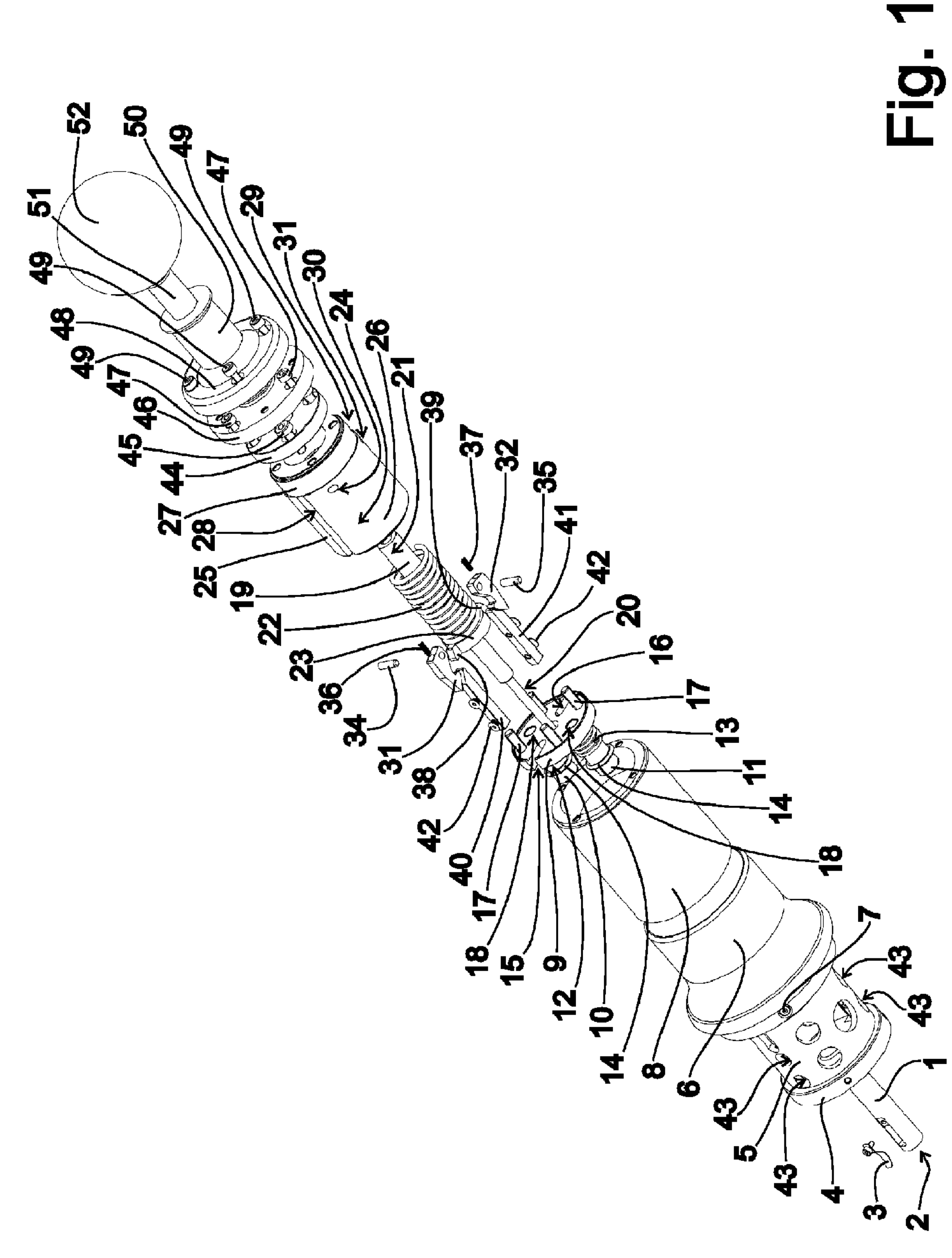
FIG. 1 is a perspective exploded view of an exemplary embodiment of a device according to the invention for setting a fastener element.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 is a perspective exploded view of an exemplary embodiment of a device according to the invention for setting a fastener element (not shown in FIG. 1). The exemplary embodiment according to FIG. 1 comprises a bolt foot barrel shaft 1 extending in the longitudinal direction, in which, at a receiving end 2, the fastener element can be fixed, preferably by a clamping means 3, for example in the form of a leaf spring. The bolt foot barrel shaft 1 stands connected to a foot plate 4, on which is mounted a cylindrical inner sleeve 5 that extends from the foot plate 4 in a direction heading away from the bolt foot barrel shaft 1.

Also present is a grip sleeve 6, which has a larger diameter than inner sleeve 5 and is dimensioned such that, by a foot end, it surrounds foot plate 4 and is detachably connectable to foot plate 4, for example by means of foot fastening screws 7. Grip sleeve 6 is configured at its end remote from bolt foot barrel shaft 1 with a radially protruding, circumferentially continuous, torus-like thickening, to make it easier to get a firm encircling grip on grip sleeve 6.

The exemplary embodiment of a device according to the invention that is depicted in FIG. 1 further comprises, as an element of an actuating mechanism, an actuating sleeve 8 whose outer diameter is at most equal to the inner diameter of grip sleeve 6 and whose inner diameter is at most equal to the outer diameter of inner sleeve 5, such that actuating sleeve 8 can be inserted between inner sleeve 5 and grip sleeve 6.

The device according to the invention is further equipped with a counterplate 9, whose outer diameter is at most equal to the inner diameter of the actuating sleeve 8. Mounted on the counterplate 9, on the side facing toward receiving end 2, are two stopper plugs 10, 11, each surrounded by an occluding helical compression spring 12, 13. Each occluding helical compression spring 12, 13 is held in place by an annular bead 14 formed on the respective stopper plug 10, 11. The stopper plugs 10, 11 lie on a diagonal of the counterplate 9, two receiving slots 15, 16 being provided in the counterplate 9, oriented in a direction perpendicular to these diagonals and extending from an edge face toward the center of the counterplate 9. Provided for attaching the counterplate 9 is an arrangement of plug-in pins 17 and plug-in openings 18 formed on the counterplate 9.

In the exemplary embodiment according to FIG. 1, the device according to the invention is also equipped with a bolt 19 extending in an axial longitudinal direction, which engages by a foot end 20 through an opening fashioned centrally in counterplate 9 and enters bolt foot barrel shaft 1. A head end 21 opposite the foot end 20 is surrounded by, as spring means, a bolt pressure spring 22, which bears by its end proximate the foot end 20 of the bolt 19 against a radially outwardly protruding, continuously circumferential bolt ring flange 23 formed between foot end 20 and head end 21.

The exemplary embodiment of a device according to the invention depicted in FIG. 1 also comprises a bushing 24, which in the exemplary embodiment of FIG. 1 is composed of two mutually oppositely disposed half-shells 25, 26 and an abutment ring 27 that fixes the half-shells 25, 26 in spaced-apart relation. A respective clearance 28, 29 extending in the longitudinal direction is thereby formed on each side between the half-shells 25, 26. In addition, each half-shell 25, 26 has, in its region facing the abutment ring 27, two bearing pin receptacles 30, 31, which are slanted toward the clearances 28, 29, are oriented transversely to the longitudinal direction and are aligned pairwise with each other.

In the exemplary embodiment according to FIG. 1, the device according to the invention is provided, as elements of a locking arrangement, with two bolt retaining clips 32, 33, which, by means of bearing pins 34, 35 inserted in bearing pin receptacles 30, 31, are held pivotably in a radial direction in the clearances 28, 29 formed between half-shells 25, 26 of bushing 24. The bolt retaining clips 32, 33 are biased to pivot radially inward by clip pressure springs 36, 37, which bear against the bolt retaining clips 32, 33, on the one hand, and against the abutment ring 27, on the other.

In the exemplary embodiment according to FIG. 1, the bolt retaining clips 32, 33 cooperate with retaining lugs 38, 39 of a projecting structure, which, as further elements of the locking arrangement, are embodied as protruding radially outward and as disposed diametrically opposite each other on the bolt ring flange 23.

As elements of an unlocking mechanism, the device according to the invention is provided, in the exemplary embodiment according to FIG. 1, with two unlocking pins 40, 41, which are disposed facing the bolt retaining clips 32, 33 in the longitudinal direction and which, upon engaging in the receiving slits 15, 16 provided in the counterplate 9, are connected to inner sleeve 5 by means of mounting screws 42 engaging through mounting receptacles 43 provided in inner sleeve 5.

On the side of abutment ring 27 facing away from the foot end 20 of the bolt 19, an abutment plate 44 is disposed on bushing 24 and is screwed to abutment ring 27 with fastening screws 45, and is, in turn, topped by an intermediate plate 46. Intermediate plate 46, as a further element of the actuating mechanism, is screwed to actuating sleeve 8 with fastening screws 47 and is itself topped by a head plate 48, which is screwed to intermediate plate 46 with fastening screws 49.

Mounted on the head plate 48 is a grip body comprising a bolt head barrel shaft 50 that extends in the longitudinal direction and comprises, on its side facing away from head plate 48, a double end stud 51, onto which, as a grip body, is screwed a spherical head knob 52 as a further component of the grip body.

Figure 2:
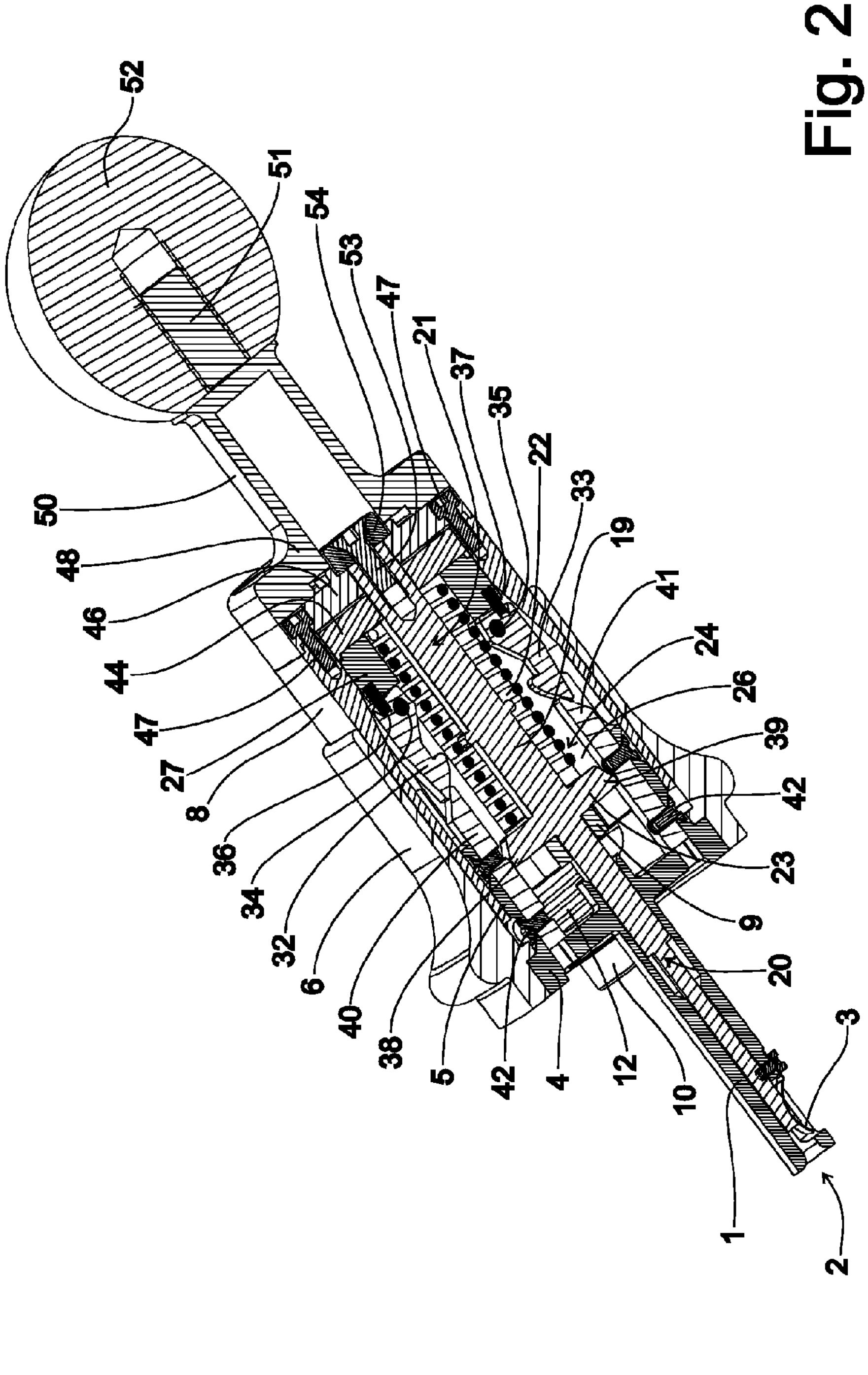
FIG. 2 is a perspective sectional view of the exemplary embodiment according to FIG. 1 in an assembled arrangement.

FIG. 2 is perspective view in longitudinal section of the device according to the invention in the exemplary embodiment according to FIG. 1 in an assembled arrangement. From FIG. 2 it can be seen that by means of bolt foot barrel shaft 1, into which foot end 20 sinks in the arrangement depicted in FIG. 2, and by means of bolt head barrel shaft 50, bolt 19 can be slid in the axial direction, with control in the longitudinal direction, against the pressure of bolt pressure spring 22, which bears against bolt ring flange 23 and abutment plate 44. Such sliding movement toward the receiving end 2 of bolt foot barrel shaft 1 is limited by a stop screw 53, as an element of an abutment means, which is screwed into the head end 21 of bolt 19 and whose head is embedded in, as a further element of the abutment means, a liner ring 54 resting in turn on the side of intermediate plate 46 facing toward head knob 52.

Figure 3:
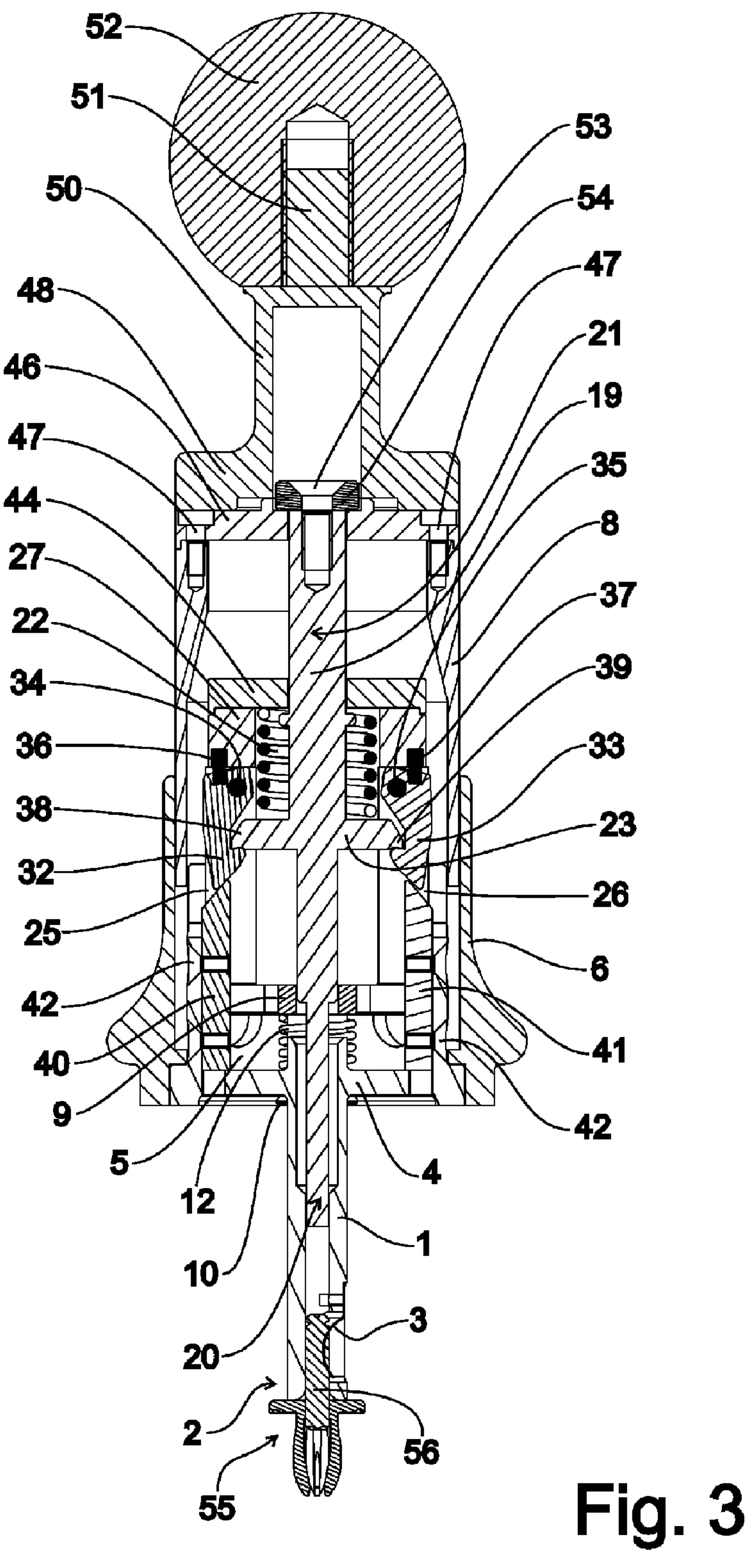
FIG. 3 is a longitudinal section of the exemplary embodiment according to FIG. 1 with a bolt in a retracted, secured position.

FIG. 3 is a longitudinal section of the exemplary embodiment of a device according to the invention described above with reference to FIG. 1 and FIG. 2, with the bolt 19 in an advanced position. The retracted position of the bolt 19 illustrated in FIG. 3 is achieved manually, by firmly encircling the grip sleeve 6 with one hand and the head knob 52 with the other hand and then pulling them relatively apart. As this occurs, intermediate plate 46 entrains bolt 19, against the pressure of bolt pressure spring 22, in a pull-up direction to the end of the tensioning movement, after the sliding of retaining lugs 38, 39, which are tapered toward the head knob 52, have gone past the bolt retaining clips 32, 33, which are tapered toward the foot plate 4, and the bolt retaining clips 32, 33 engage behind the retaining lugs 38, 39, causing the bolt 19 to be held in this retracted position and biased by the force exerted by the bolt pressure spring 22.

In this retracted position of bolt 19, a fastener element, which in the representation of FIG. 3 is embodied as a so-called expanding rivet 55, can now be inserted by an inner pin 56 into the receiving end 2 of bolt foot barrel shaft 1, whereupon the clamping means 3 fix inner pin 56 in bolt foot barrel shaft 1.

Figure 4:
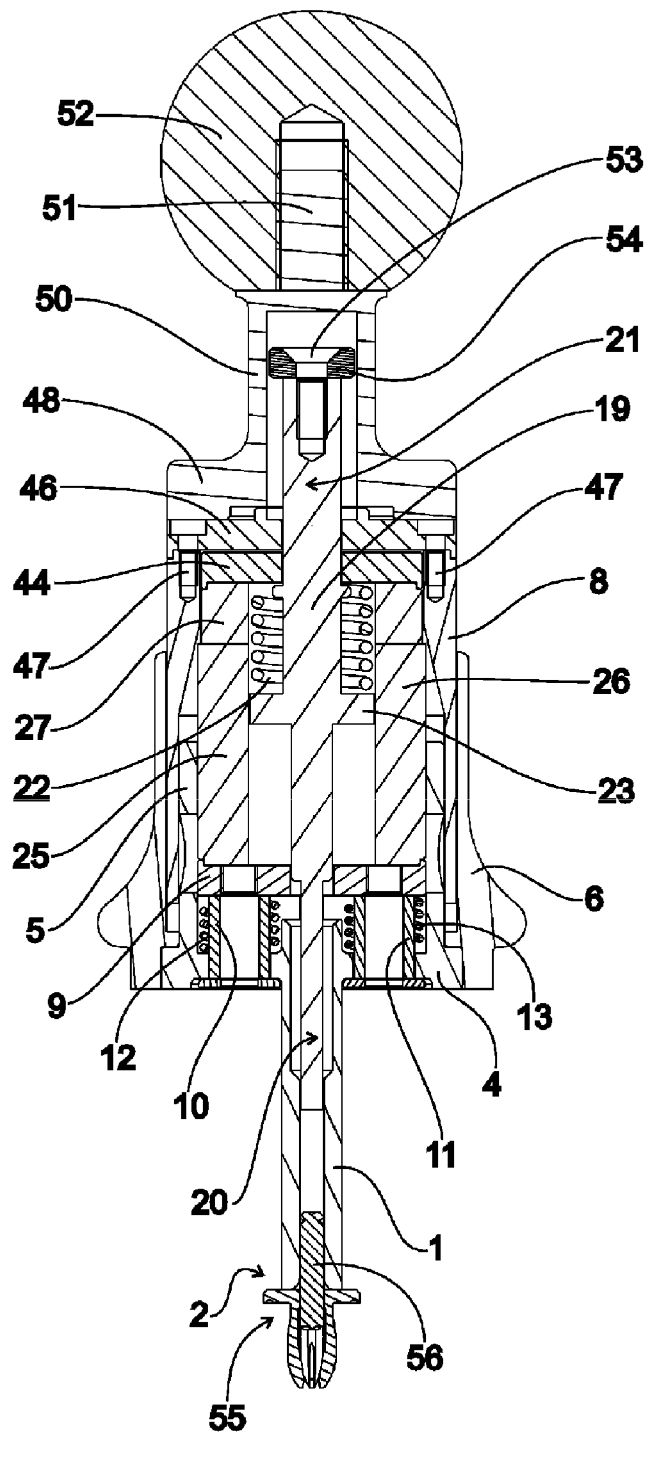
FIG. 4 is a longitudinal section of the exemplary embodiment according to FIG. 1 in which the section plane is rotated 90 degrees compared to the representation of FIG. 3.

FIG. 4 shows the previously described exemplary embodiment of a device according to the invention in a sectional view in which the section plane is rotated 90 degrees compared to the depiction of FIG. 3, and in an arrangement wherein grip sleeve 6 and head knob 52 have been moved, counter to the pull-up direction, closer together than they are in FIG. 3. In this intermediate position according to FIG. 4, intermediate plate 46 rests directly on abutment plate 44, but without moving the firmly interconnected abutment assembly of abutment plate 44, abutment ring 27, out of the bushing 24 comprised of half-shells 25, 26, together with the bolt retaining clips 32, 33 attached thereto, in the direction of foot plate 4, counter to the pull-up direction. In this intermediate position, the bolt retaining clips 32, 33 and the retaining lugs 38, 39 are still in the arrangement illustrated in FIG. 3, in which the bolt 19 is secured by rear engagement.

Figure 5:
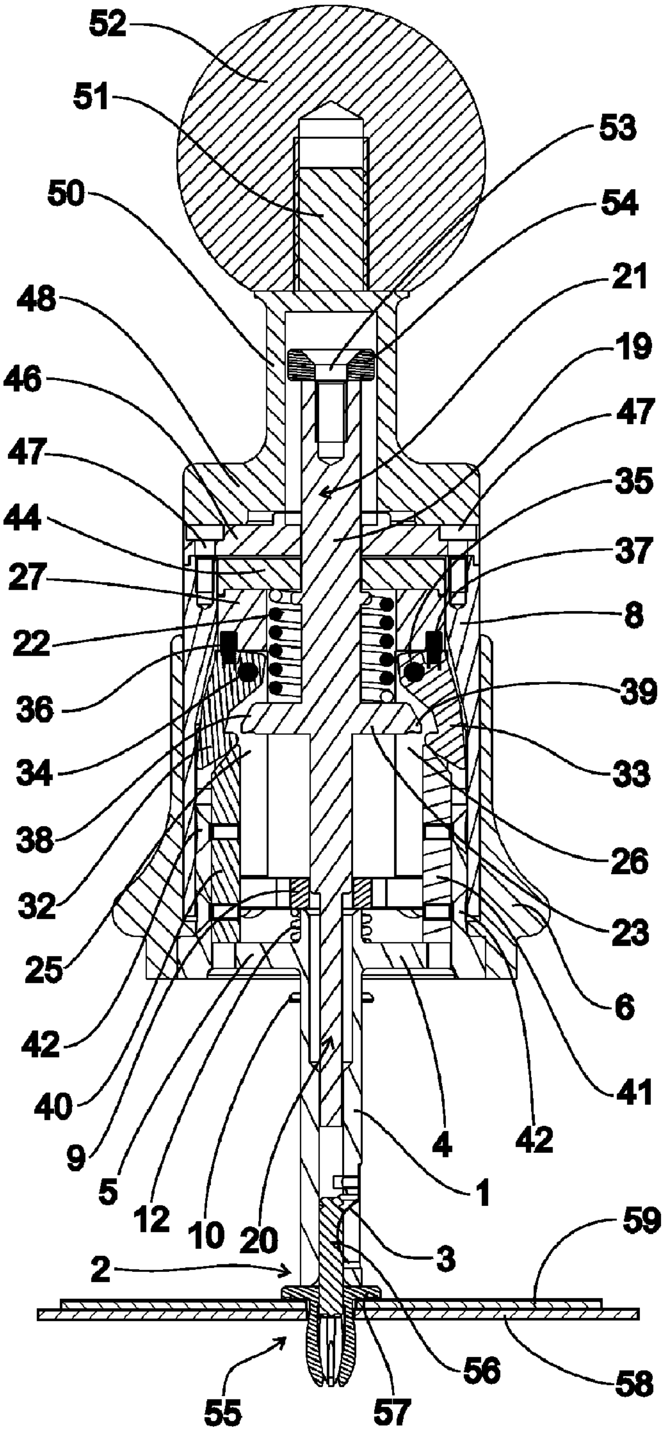
FIG. 5 is a longitudinal section of the exemplary embodiment according to FIG. 1 taken in the same section plane as in the representation of FIG. 3, with the bolt in a retracted, released position.

FIG. 5 shows the exemplary embodiment previously described with reference to FIGS. 1 to 4 with the expanding rivet 55 in an arrangement wherein it is inserted by an external body 57 in a support part 58 and in an add-on part 59 that is to be connected to said support part 58. In the released position shown in FIG. 5, in which the grip sleeve 6 and the head knob 52 have been moved still closer together, counter to the pull-up direction, compared to the intermediate position depicted in FIG. 4, the bolt retaining clips 32, 33 have slid by their bevels up onto and along the bevels of unlocking pins 40, 41 that face bolt retaining clips 32, 33, and have been moved radially outward by the resultant spreading action, thus eliminating the rear engagement of retaining lugs 38, 39.

Figure 6:
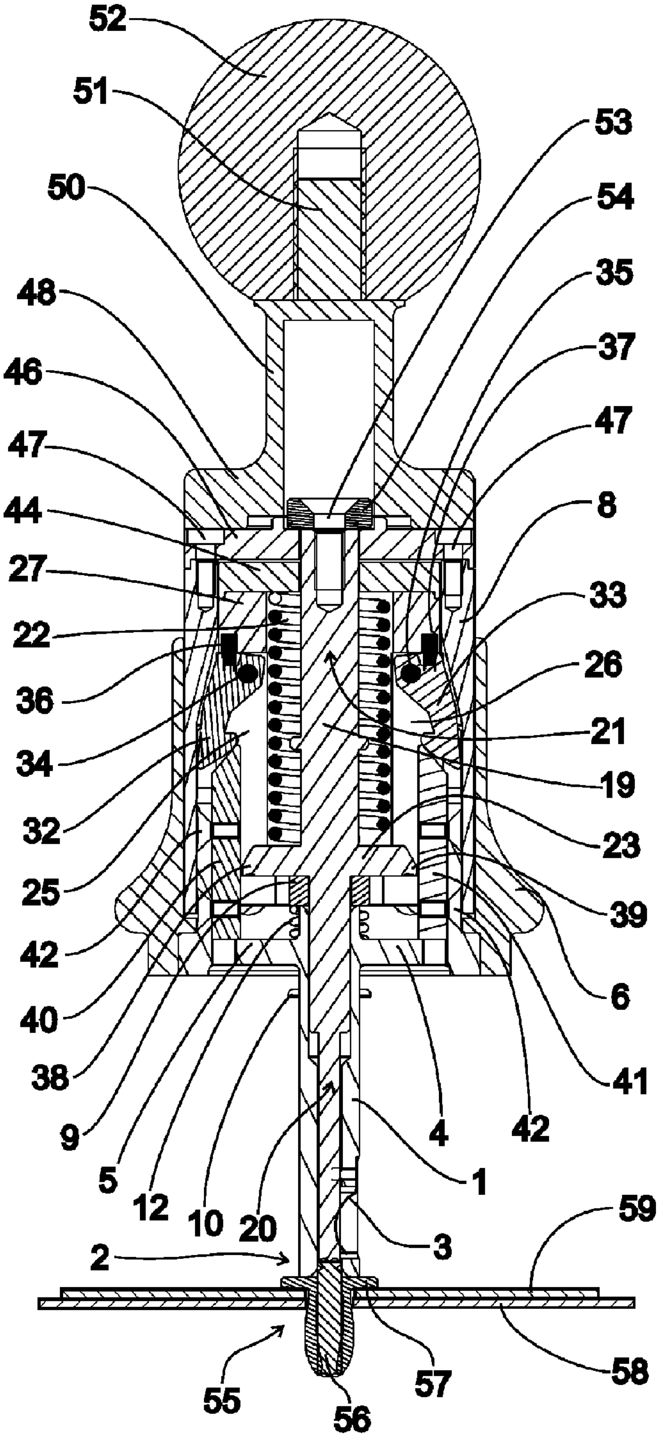
FIG. 6 is a longitudinal section of the exemplary embodiment according to FIG. 1 taken in the same section plane as in the representations of FIG. 3 and FIG. 5, with the bolt in an advanced position.

FIG. 6 shows the exemplary embodiment of a device according to the invention described above with reference to FIGS. 1 to 5 in a longitudinal section corresponding to the representation of FIGS. 3 and 5 after relaxation of the bolt pressure spring 22, which, starting in the released position illustrated in FIG. 5, has automatically pressed the bolt 19 into the advanced position until bolt ring flange 23 rests against counterplate 9. In assuming this advanced position, bolt 19, by the end face of foot end 20, pushes inner pin 56 into an external body 57 to connect the support part 58 to the add-on part 59.

Figure 7:
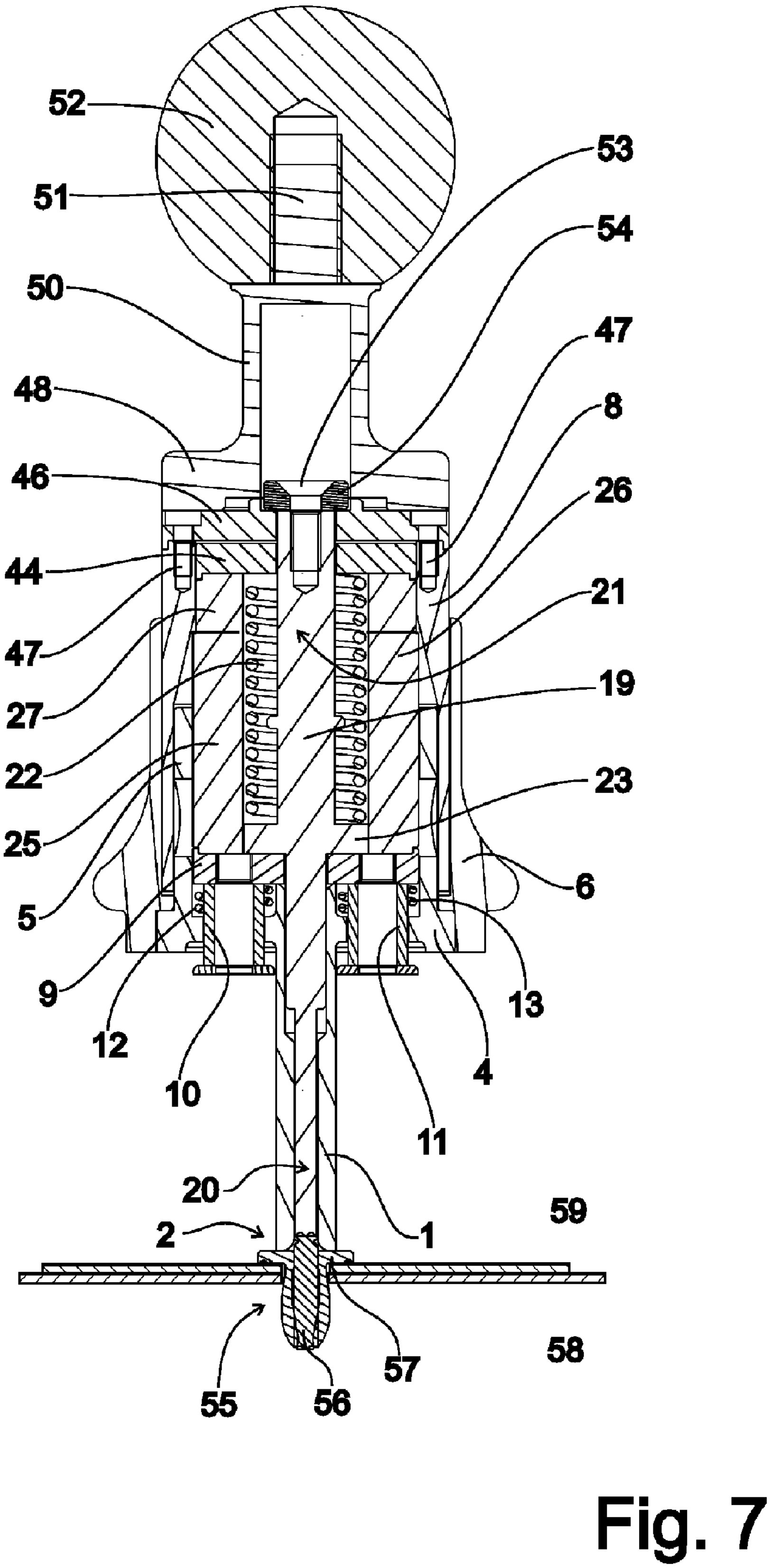
FIG. 7 is a longitudinal section of the exemplary embodiment according to FIG. 1 taken in the same section plane as in the representation of FIG. 4, with the bolt in the advanced position illustrated in FIG. 6.

FIG. 7 shows the above-described exemplary embodiment of a device according to the invention in a sectional view, taking the same section plane as in FIG. 4 and with the bolt 19 in the advanced position illustrated in FIG. 6. It will be appreciated from FIG. 7 that with the bolt 19 in the advanced position, the stopper plugs 10, 11 have come out of the foot plate 4. The excursion of the stopper plugs 10, 11 here corresponds to the travel of the bolt 19 between the arrangement of FIG. 4 and the arrangement of FIG. 5, i.e., precisely the relative distance between the bolt retaining clips 32, 33 and the unlocking pins 40, 41 that must be traveled in order to release the bolt retaining clips 32, 33 from rear engagement with the retaining lugs 38, 39.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A device for setting a fastener element having an inner pin slidable relative to an external body, said device comprising:

a grip body extending in an axial direction;

a bolt slidable in said axial direction within said grip body between an advanced position and a retracted position, said bolt engaging the inner pin of the fastener element in said advanced position;

a locking arrangement operable in said retracted position to secure said bolt against sliding axially into said advanced position;

an actuating mechanism connected to said grip body and engageable with said bolt, said actuating mechanism operable to move said bolt from said advanced position to said retracted position upon movement of said actuating mechanism in an axially oriented pull-up direction; and an unlocking mechanism acting on said locking arrangement and operable to release securement of said bolt by moving said actuating mechanism counter to said pull-up direction.

2. The device of claim 1, further comprising a spring which, in said retracted position, biases said bolt toward said advanced position.

3. The device of claim 2, wherein said actuating mechanism comprises a cylindrical actuating sleeve occluded by an intermediate plate through which a head end of said bolt engages, said bolt secured against sliding out of said intermediate plate by an abutment.

4. The device of claim 2, wherein said locking arrangement comprises at least one bolt retaining clip pivotable in a radial direction and a projecting structure formed on said bolt and cooperating with each said bolt retaining clip.

5. The device of claim 4, wherein each said bolt retaining clip is biased to act radially inwardly by a respective clip clamping spring.

6. The device of claim 5, wherein each said bolt retaining clip is mounted on an abutment assembly.

7. The device of claim 6, wherein said abutment assembly comprises a bushing and an abutment plate firmly connected to said bushing, and each said bolt retaining clip is accommodated pivotably in a radial direction in an assigned clearance formed in said bushing.

8. The device of claim 7, wherein said unlocking mechanism further comprises unlocking pins mounted on an inner sleeve that is slidable relative to said abutment assembly, each unlocking pin assigned to a respective bolt retaining clip.

9. The device of claim 8, wherein each said bolt retaining clip comprises a bevel on which a respective said unlocking pin acts to move said bolt retaining clip radially outward as securement of said bolt is released.

10. The device of claim 9, wherein said spring bears against a continuously circumferential bolt ring flange formed on said bolt and said projecting structure is formed on said bolt ring flange.

* * * * *